(12) United States Patent
Gao

(10) Patent No.: US 8,374,612 B2
(45) Date of Patent: *Feb. 12, 2013

(54) METHOD FOR OBTAINING THE TRANSMISSION ADDRESS OF THE TARGET BASE STATION AND METHOD FOR ESTABLISHING THE X2 INTERFACE CONNECTION

(75) Inventor: Yin Gao, Shenzhen (CN)

(73) Assignee: ZTE Corporation (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/142,300

(22) PCT Filed: Dec. 30, 2008

(86) PCT No.: PCT/CN2008/002132
§ 371 (c)(1),
(2), (4) Date: Jun. 27, 2011

(87) PCT Pub. No.: WO2010/078676
PCT Pub. Date: Jul. 15, 2010

(65) Prior Publication Data
US 2011/0269471 A1 Nov. 3, 2011

(51) Int. Cl.
*H04W 36/00* (2009.01)
(52) U.S. Cl. .......................... 455/437; 455/436; 370/331
(58) Field of Classification Search .......... 455/436–437; 370/331
See application file for complete search history.

(56) References Cited

U.S. PATENT DOCUMENTS

| | | | |
|---|---|---|---|
| 2008/0119189 A1* | 5/2008 | Chang et al. .................. | 455/436 |
| 2009/0042597 A1* | 2/2009 | Yuuki ........................... | 455/525 |
| 2009/0141684 A1* | 6/2009 | Hashimoto et al. ........... | 370/331 |
| 2010/0046476 A1* | 2/2010 | Qiu ............................... | 370/331 |
| 2010/0056156 A1* | 3/2010 | Xu et al. ....................... | 455/436 |
| 2010/0062774 A1* | 3/2010 | Motegi et al. ................. | 455/437 |
| 2010/0120434 A1* | 5/2010 | Hasegawa ..................... | 455/436 |
| 2010/0329208 A1* | 12/2010 | Hayashi et al. ............... | 370/331 |
| 2011/0243097 A1* | 10/2011 | Lindqvist et al. ............. | 370/331 |

FOREIGN PATENT DOCUMENTS

| | | |
|---|---|---|
| CN | 1464759 A | 12/2003 |
| CN | 101299876 A | 11/2008 |
| CN | 101321101 A | 12/2008 |
| WO | 2008090133 A1 | 7/2008 |

OTHER PUBLICATIONS

Qualcomm Europe T-Mobile, "Discovery of Neighbor eNB IP Address", Aug. 2008; 5 Pages, Jeju Island, Korea.
ZTE, "Transport layer Addresses Lookup to Support ANR", Nov. 2008; 4 Pages, Prague, Czech Republic.

* cited by examiner

*Primary Examiner* — Jinsong Hu
*Assistant Examiner* — Nathan Taylor
(74) *Attorney, Agent, or Firm* — Brooks Kushman P.C.

(57) ABSTRACT

A method for obtaining transmission address information of a target base station (BS), comprising: configuring a target BS with corresponding relations between information of each transmission address of the target BS and related information of other BSs; a source BS transmitting its related information to the target BS through a MME; after receiving the related information of the source BS, the target BS filtering out transmission address information required for establishing an X2 interface connection with the source BS from all transmission addresses of the target BS, and transmitting the out-filtered transmission address information to the target BS through the MME. A method for establishing an X2 interface connection between BSs further comprises, besides the above steps, the source BS initiating a flow of establishing the X2 interface connection to the target BS using the transmission address information of the target BS after receiving it.

6 Claims, 2 Drawing Sheets

METHOD FOR OBTAINING THE TRANSMISSION ADDRESS OF THE TARGET BASE STATION AND METHOD FOR ESTABLISHING THE X2 INTERFACE CONNECTION

CROSS-REFERENCE TO RELATED APPLICATION

This application is the U.S. national phase of PCT Application No. PCT/CN2008/002132 filed Dec. 30, 2008, the disclosure of which is incorporated in its entirety by reference herein.

TECHNICAL FIELD

The present invention relates to the wireless cellular communication system, and in particular, to a method for obtaining transmission address information of a target base station and a method for establishing an X2 interface connection between base stations in a Long Term Evolution (LTE) mobile communication system.

BACKGROUND ART

It is described in 36300-800 that a LTE (Long Term Evolution) network is composed of E-UTRAN (Evolved UTRAN) base station eNBs (Evolved NodeBs) and EPCs (Evolved Packet Cores), and the network is flattened. Wherein, E-UTRAN includes an assembly of eNBs connecting with the EPC through S1 interfaces, and eNBs are connected with each other through X2 interfaces. A S1 interface and X2 interface are logical interfaces. One EPC can manage one or more eNBs, one eNB can also be controlled by a plurality of EPCs, and one eNB can manage one or more cells.

A Self-Organized Network (SON) is a technique of automatically configuring and optimizing a network. The characteristic of this technique is self configuration and self optimization, and use of this technique in LTE can enable the LTE base station (eNB) to automatically configure network parameters according to measurement results and to perform automatic optimization according to the change of the network, thereby keeping the network performance optimal and meanwhile saving a large quantity of manpower and materials.

In LTE system, whether it is necessary to establish X2 interfaces between base stations can be decided according to the current strategy; if an X2 interface needs to be established between two base stations, then when any one of the base stations initiates an X2 interface establishing request, it needs to know the transmission address (TLA) of the other base station. Therefore, when a base station is powered on and starts to work in the network, it is necessary to know the transmission addresses of the neighbor base stations that allows establishment of an X2 interface.

In a case where the base stations belong to different operators or the base stations are multi-mode base stations or in other similar cases, one base station is allowed to be configured with a plurality of transmission addresses for X2 interface connection, therefore, there may be a situation in which when a source base station requests the target base station for transmission address information, the target base station does not know which transmission address needs to be transmitted to the above source base station, due to which the X2 interface between the target base station and the source base station cannot be established.

SUMMARY OF THE INVENTION

The technical problem to be solved in the present invention is to provide a method for obtaining transmission address information of a target base station and a method for establishing an X2 interface connection between base stations, so as to avoid the problem that the target base station cannot correctly select transmission address information required for establishing an X2 interface connection with a source base station.

In order to solve the above problem, the present invention provides a method for obtaining transmission address information of a target base station, comprising the following steps of:

configuring the target base station with corresponding relations between information of each transmission address of the target base station and related information of other base stations;

a source base station transmitting related information of the source base station to the target base station through a mobility management entity (MME); after receiving the related information of the source base station, the target base station filtering out transmission address information required for establishing an X2 interface connection with the source base station from all transmission addresses of the target base station according to the related information of the source base station, and transmitting the out-filtered transmission address information to the target base station through the MME.

Furthermore, the above method is also characterized in that:

the source base station transmitting the related information of the source base station to the target base station through the MME means: the source base station transmits a transmission address request message to the target base station through the MME, wherein the transmission address request message carries the related information of the source base station;

the target base station transmitting the out-filtered transmission address information to the target base station through the MME means: the target base station transmits a transmission address response message to the source base station through the MME, wherein the transmission address response message carries the out-filtered transmission address information.

Furthermore, the above method is also characterized in that:

the related information of the source base station comprises: a global identifier of the source base station and/or information of an operator to whom the source base station belongs.

Furthermore, the above method is also characterized in that:

when a user equipment (UE) requests to handover from a cell served by the source base station to a cell served by the target base station, the transmission address request message is a handover request message;

the target base station transmitting a transmission address response message to the source base station through the MME means: the target base station transmits a handover request acknowledge message to the MME, wherein the handover request acknowledge message carries the transmission address information of the target base station; after receiving the handover request acknowledge message, the MME transmits the transmission address information of the target base station to the source base station through a handover command;

the related information of the source base station comprises: any one of a global identifier of the source base station, information of an operator to whom the source base station belongs and a global identifier of a service cell where the UE is located, and any combination thereof.

Furthermore, the above method is also characterized in that:

the source base station also transmits, in addition to the related information of the source base station, the transmission address information required for establishing an X2 interface connection between the source base station and the target base station.

The present invention further provides a method for establishing an X2 interface connection between base stations, comprising the following steps of:

configuring a target base station with corresponding relations between information of each transmission address of the target base station and related information of other base stations;

a source base station transmitting related information of the source base station to the target base station through a mobility management entity (MME) when the source base station is to establish an X2 interface connection with the target base station; after receiving the related information of the source base station, the target base station filtering out transmission address information required for establishing the X2 interface connection with the source base station from all transmission addresses of the target base station according to the related information of the source base station, and transmitting the out-filtered transmission address information to the target base station through the MME;

the source base station initiating a flow of establishing the X2 interface connection to the target base station using the received transmission address information after receiving the transmission address information of the target base station.

Furthermore, the above method is also characterized in that:

the source base station transmitting the related information of the source base station to the target base station through the MME means: the source base station transmits a transmission address request message to the target base station through the MME, wherein the transmission address request message carries the related information of the source base station;

the target base station transmitting the out-filtered transmission address information to the target base station through the MME means: the target base station transmits a transmission address response message to the source base station through the MME, wherein the transmission address response message carries the out-filtered transmission address information.

Furthermore, the above method is also characterized in that:

the related information of the source base station comprises: a global identifier of the source base station and/or information of an operator to whom the source base station belongs.

Furthermore, the above method is also characterized in that:

when a user equipment (UE) requests to handover from a cell served by the source base station to a cell served by the target base station, the transmission address request message is a handover request message;

the target base station transmitting a transmission address response message to the source base station through the MME means: the target base station transmits a handover request acknowledge message to the MME, wherein the handover request acknowledge message carries the transmission address information of the target base station; after receiving the handover request acknowledge message, the MME transmits the transmission address information of the target base station to the source base station through a handover command;

the related information of the source base station comprises: any one of a global identifier of the source base station, information of an operator to whom the source base station belongs and a global identifier of a service cell where the UE is located, and any combination thereof.

Furthermore, the above method is also characterized in that:

the source base station also transmits, in addition to the related information of the source base station, the transmission address information required for establishing the X2 interface connection between the source base station and the target base station.

The present invention facilitates effective and rapid establishment of an X2 interface between base stations, and reflects the integrity of X2 interface management in automatic optimization of neighbor-cell relationships.

PREFERRED EMBODIMENTS OF THE PRESENT INVENTION

Figure 1:
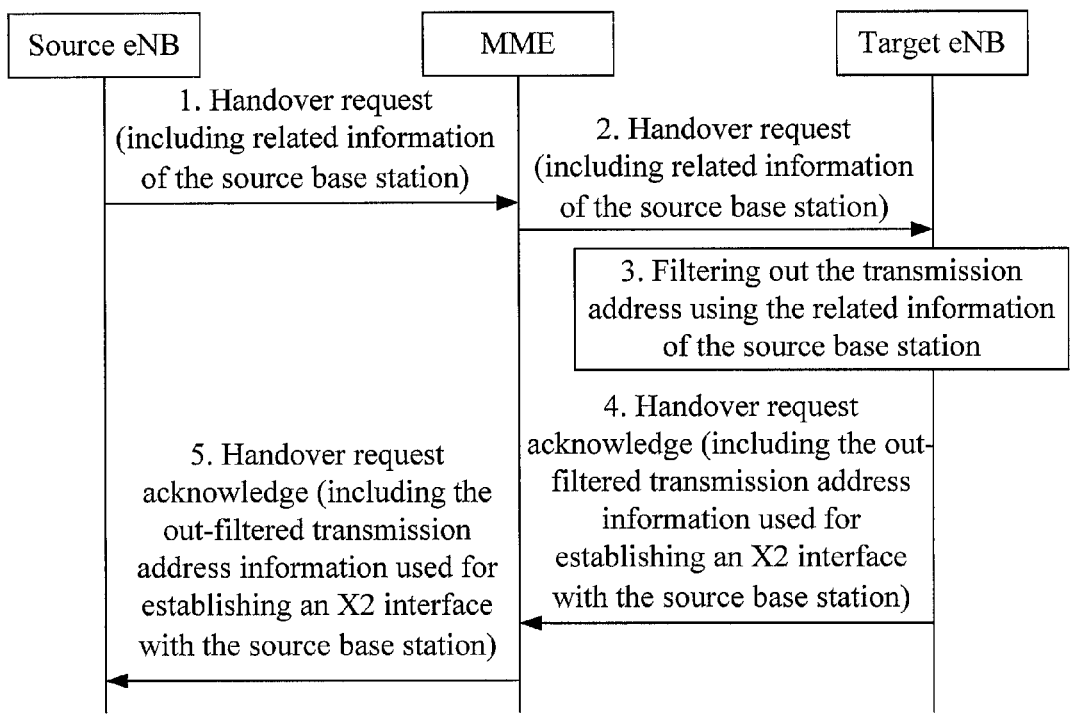
FIG. 1 is a flow chart of the method for establishing an X2 interface between base stations according to Application Example One of the present invention.

The technical solution of the present invention will be described in further detail below with reference to the drawings and examples.

The basic idea of the present invention is as follows: the target base station is configured with corresponding relations between information of each transmission address of the target base station and related information in other base stations; a source base station transmits a transmission address request message to the target base station through a mobility management entity (MME) of EPC, wherein the transmission address request message carries the related information of the source base station; after receiving the transmission address request message, the target base station filters out transmission address information required for establishing an X2 interface connection with the source base station from all transmission addresses of the target base station according to the related information of the source base station, and transmits a transmission address response message to the source base station through the MME, wherein the transmission address response message carries the transmission address information of the target base station.

After receiving the above transmission address response message, the source base station initiates a flow of establishing an X2 interface connection according to the above transmission address information of the target base station if it is necessary to establish an X2 interface connection with the target base station. The flow is the same with the prior art, and thus will not be described here.

Wherein, the source base station and the target base station are connected with the MME respectively through S1 interfaces; the related information of the source base station may include: a global identifier of the source base station and/or information of the operator to whom the source base station belongs (for example, the ID of the Public Land Mobile Network (PLMN) to which the source base station belongs). The target base station can uniquely determine the source base station based on the global identifier of the source base station, therefore, the transmission address information required for establishing an X2 interface with the source base station can be filtered out; with the operator's information, transmission address information used when the base station belongs to the same operator as the source base station can be filtered out in the present base station.

When a user equipment (UE) requests to handover from a cell served by the source base station to a cell served by the target base station, the transmission address request message may be a handover request message, correspondingly, the transmission address response message may be a handover request acknowledge message. In this case, the related information of the source base station may be carried by an information element of Source RNC To Target RNC Transparent Container, the related information may also include the global identifier of the service cell where the UE initiating a handover flow is located, and the target base station may also filter out the transmission address information required for establishing an X2 interface with the source base station according to the global identifier; the transmission address information of the target base station is carried by an information element of Target RNC to Source RNC Transparent Container.

In addition, the transmission address request message and transmission address response message may not be existing messages, but a group of messages newly established for obtaining the transmission address of the target base station. The transmission address request message may also carry the transmission address information of the source base station.

To sum up, the related information of the source base station can be used in the present invention to enable the target base station to filter a plurality of transmission addresses that are currently configured for establishing an X2 interface to find out the transmission address required for establishing an X2 interface with the source base station, and transmit the transmission address to the source base station through a transmission address response message, which facilitates effective and rapid establishment of an X2 interface between base stations, and reflects the integrity of X2 interface management in automatic optimization of neighbor-cell relationships.

The present invention will be further described below with reference to the two examples of the present invention.

As shown in FIG. 1, Application Example One is described as follows:

1. A terminal in a certain cell of the source base station initiates a S1 handover request, the related information of the source base station, such as the global identifier of the source base station, the global identifier of the service cell where the UE initiating a handover flow is located, and information of an operator to whom the source base station belongs, is added to the Source RNC To Target RNC Transparent Container information. The listed related information of the source base station may be used separately or in combination. The Source RNC To Target RNC Transparent Container information is included in the HANDOVER REQUIRED (handover request) message sent from the source base station to the MME;

2. After the MME receives the HANDOVER REQUIRED message, it transparently transmits the Source RNC To Target RNC Transparent Container information to the target base station through the HANDOVER REQUEST message;

3. After receiving the HANDOVER REQUEST message, the target base station analyzes the information contained in the Source RNC To Target RNC Transparent Container information, for example, finding out the transmission address required for establishing an X2 connection with the source base station in the transmission address list information used for establishing an X2 interface that is configured locally. The target base station includes the transmission address information required for establishing an X2 interface connection between the target base station and the source base station in the Target RNC to Source RNC Transparent Container information through the handover request acknowledge message;

4. After receiving the handover request acknowledge message, the MME transparently transmits the Target RNC to Source RNC Transparent Container information to the source base station through a handover command;

5. The source base station can implement establishment of an X2 interface with the target base station using the transmission address information required for establishing an X2 interface connection between the target base station and the source base station contained in the Target RNC to Source RNC Transparent Container information.

Figure 2:
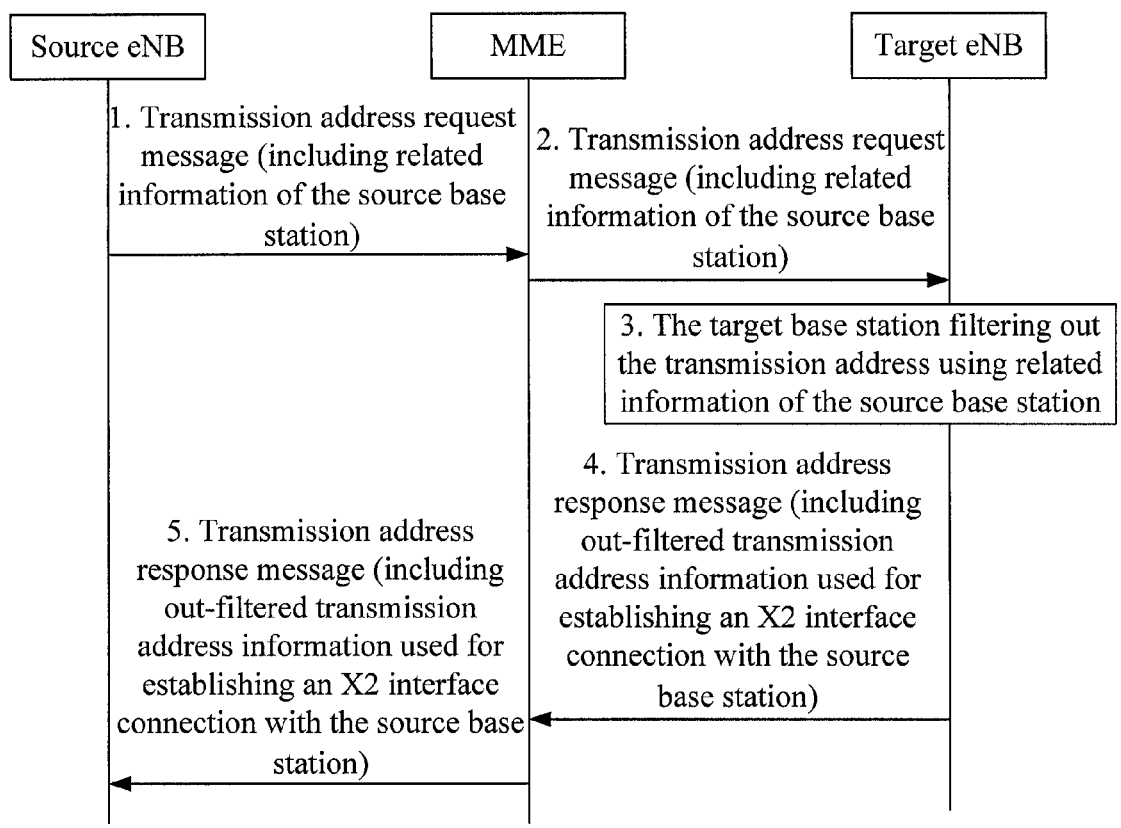
FIG. 2 is a flow chart of the method for establishing an X2 interface between base stations according to Application Example Two of the present invention.

As shown in FIG. 2, the Application Example Two is described as follows:

1. When a source base station currently needs to initiate establishment of an X2 interface with a certain base station among neighbor base stations in the current network, the source base station transmits a transmission address request message to the MME, wherein the message carries the related information of the source base station, such as the global identifier of the source base station, information of an operator to whom the source base station belongs and the like, and the listed related information of the source base station may be used separately or in combination;

2. After receiving the transmission address request message, the MME transparently transmits the message to the target base station;

3. After receiving the transmission address request message, the target base station analyzes the related information of the source base station contained therein, for example, finding out the transmission address required for establishing an X2 connection with the source base station in the transmission address list information used for establishing an X2 interface that is configured locally. The target base station transmits the transmission address information required for establishing an X2 interface connection between the target base station and the source base station to the MME through a transmission address response message;

4. The MME transparently transmits the transmission address response message to the source base station after receiving the transmission address response message;

5. The source base station can achieve establishment of an X2 interface with the target base station using the transmission address information required for establishing an X2 interface connection between the target base station and the source base station contained in the transmission address response.

Industrial Applicability

The related information of the source base station can be used in the present invention to enable the target base station to filter a plurality of transmission addresses that are currently configured for establishing an X2 interface to find out the transmission address required for establishing an X2 interface with the source base station, and transmit the transmission address to the source base station through a transmission address response message, which facilitates effective and rapid establishment of an X2 interface between base stations, and reflects the integrity of X2 interface management in automatic optimization of neighbor-cell relationships.

What is claimed is:

1. A method for obtaining transmission address information of a target base station, comprising the following steps of:

configuring the target base station with corresponding relations between information of each transmission address of the target base station and related information of other base stations;

a source base station transmitting related information of the source base station including a transmission address request message to the target base station through a mobility management entity (MME), wherein the transmission address request message carries the related information of the source base station; after receiving the related information of the source base station, the target base station filtering out transmission address information required for establishing an X2 interface connection with the source base station directly from all transmission addresses in the transmission address list information of the target base station according to the related information of the source base station, and transmitting the out-filtered transmission address information including a transmission response message to the source base station through the MME, wherein the MME transparently transmits the out-filtered transmission address information from the target base station to the source base station and the transmission address response message carries the out-filtered transmission address information, wherein, when a user equipment (UE) requests to handover from a cell served by the source base station to a cell served by the target base station, the transmission address request message is a handover request message, and the target base station transmitting a transmission address response message to the source base station through the MME means that the target base station transmits a handover request acknowledge message to the MME, wherein the handover request acknowledge message carries the transmission address information of the target base station; after receiving the handover request acknowledge message, the MME transmits the transmission address information of the target base station to the source base station through a handover command, and the related information of the source base station comprises any one of a global identifier of the source base station, information of an operator to whom the source base station belongs and a global identifier of a service cell where the UE is located, and any combination thereof, and the source base station also transmitting, in addition to the related information of the source base station, the transmission address information required for establishing an X2 interface connection between the source base station and the target base station.

2. The method according to claim 1, wherein,
the related information of the source base station comprises: a global identifier of the source base station and/or information of an operator to whom the source base station belongs.

3. The method according to claim 1, wherein,
the related information of the source base station comprises: a global identifier of the source base station and/or information of an operator to whom the source base station belongs.

4. A method for establishing an X2 interface connection between base stations, comprising the following steps of:

configuring a target base station with corresponding relations between information of each transmission address of the target base station and related information of other base stations;

a source base station transmitting related information of the source base station including a transmission address request message to the target base station through a mobility management entity (MME), wherein the transmission address request message carries the related information of the source base station; when the source base station is to establish an X2 interface connection with the target base station; after receiving the related information of the source base station, the target base station filtering out transmission address information required for establishing the X2 interface connection with the source base station directly from all transmission addresses in the transmission address list information of the target base station according to the related information of the source base station, and transmitting the out-filtered transmission address information including a transmission address response message to the source base station through the MME, wherein the MME transparently transmits the out-filtered transmission address information from the target base station to the source base station and the transmission address response message carries the out-filtered transmission address information;

the source base station initiating a flow of establishing the X2 interface connection to the target base station using the received transmission address information after receiving the transmission address information of the target base station, wherein, when a user equipment (UE) requests to handover from a cell served by the source base station to a cell served by the target base station, the transmission address request message is a handover request message, and the target base station transmitting a transmission address response message to the source base station through the MME means that the target base station transmits a handover request acknowledge message to the MME, wherein the handover request acknowledge message carries the transmission address information of the target base station, and, after receiving the handover request acknowledge message, the MME transmits the transmission address information of the target base station to the source base station through a handover command, and the related information of the source base station comprises any one of a global identifier of the source base station, information of an operator to whom the source base station belongs and a global identifier of a service cell where the UE is located, and any combination thereof, and the source base station also transmitting, in addition to the related information of the source base station, the transmission address information required for establishing the X2 interface connection between the source base station and the target base station.

5. The method according to claim 4, wherein,
the related information of the source base station comprises: a global identifier of the source base station and/or information of an operator to whom the source base station belongs.

6. The method according to claim 4, wherein,
the related information of the source base station comprises: a global identifier of the source base station and/or information of an operator to whom the source base station belongs.

* * * * *